United States Patent [19]

Alinari

[11] 4,196,623
[45] Apr. 8, 1980

[54] DEPTH GAUGES

[76] Inventor: Carlo Alinari, Corso Vittorio Emanuele 200, Turin, Italy

[21] Appl. No.: 947,924

[22] Filed: Oct. 2, 1978

[30] Foreign Application Priority Data

Jul. 28, 1978 [IT] Italy .................. 68807 A/78

[51] Int. Cl.² .................. G01F 23/16; G01L 7/04
[52] U.S. Cl. ............................. 73/300; 73/740
[58] Field of Search ............... 73/300, 708, 740, 299

[56] References Cited

U.S. PATENT DOCUMENTS

| | | | |
|---|---|---|---|
| 3,203,244 | 8/1965 | Alinari | 73/300 |
| 3,651,693 | 3/1972 | Alinari | 73/300 |
| 3,693,446 | 9/1972 | MacNeil | 73/300 |
| 3,712,138 | 1/1973 | Alinari | 73/300 |
| 3,837,225 | 9/1974 | Alinari | 73/300 |
| 3,868,853 | 3/1975 | Alinari | 73/300 |
| 3,869,916 | 3/1975 | Ojima | 73/300 |
| 4,050,314 | 9/1977 | Longhetto | 73/300 |
| 4,052,899 | 10/1977 | Longhetto | 73/300 |

FOREIGN PATENT DOCUMENTS 839749  4/1939  France ..................... 73/299

*Primary Examiner*—S. Clement Swisher
*Assistant Examiner*—Denis E. Corr
*Attorney, Agent, or Firm*—Sughrue, Rothwell, Mion, Zinn and Macpeak

[57] ABSTRACT

A depth gauge, of the type having a dial with a graduated scale over which an indicator needle is movable by a manometer unit housed in a capsule filled with liquid which communicates ambient pressure to a pressure-sensitive element of the manometer, in which there are provided calibration means for adjusting the pressure within the capsule with respect to the external ambient pressure in order to adjust the needle setting to zero immediately prior to use. The capsule may have one or two flexible walls and the calibration means include a screw threaded element, which may be part of a casing for the capsule or may be screwed into a part of this casing, which engages the resiliently flexible wall and causes flexure of it one way or the other when screwed in one direction or the other, to increase or reduce the pressure in the liquid filling the capsule with respect to the external ambient pressure.

10 Claims, 11 Drawing Figures

U.S. Patent  Apr. 8, 1980  Sheet 1 of 3  4,196,623
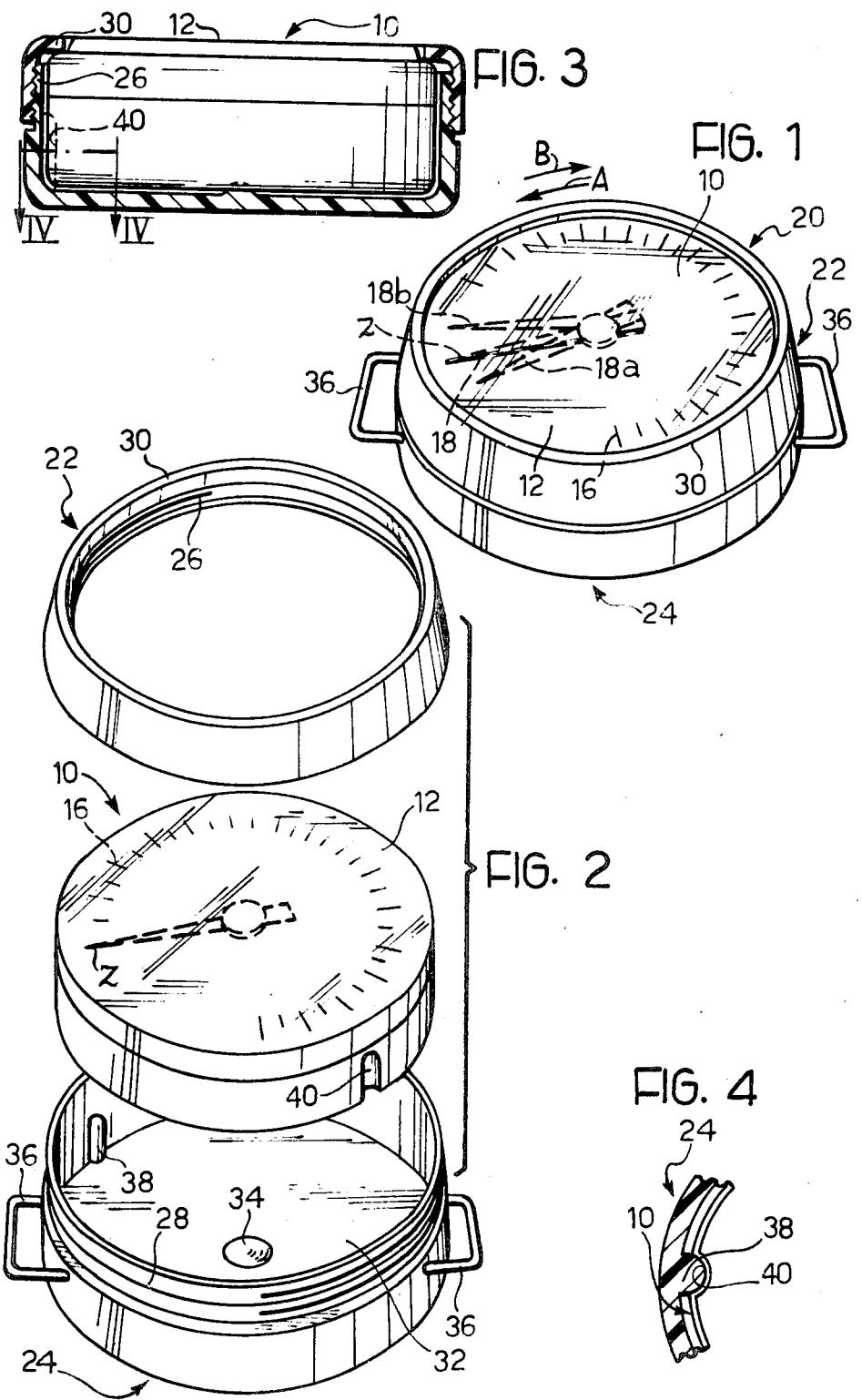

U.S. Patent Apr. 8, 1980 Sheet 3 of 3 4,196,623
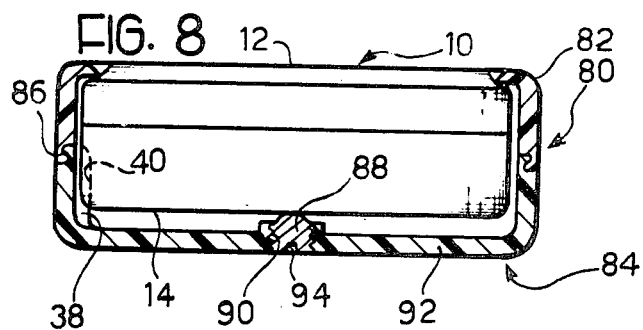
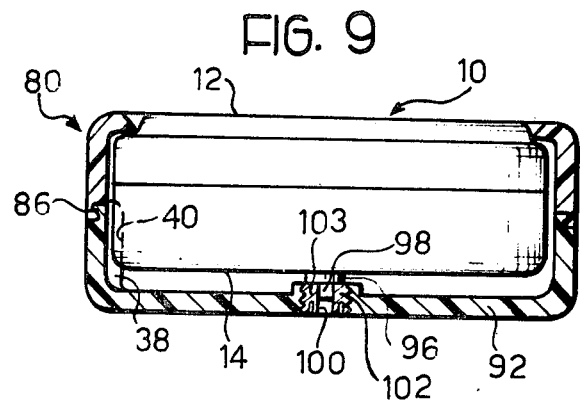
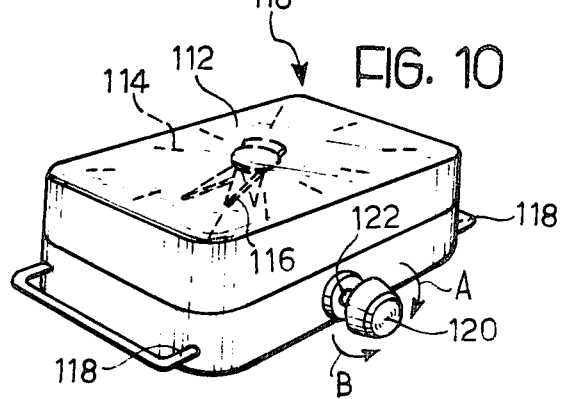
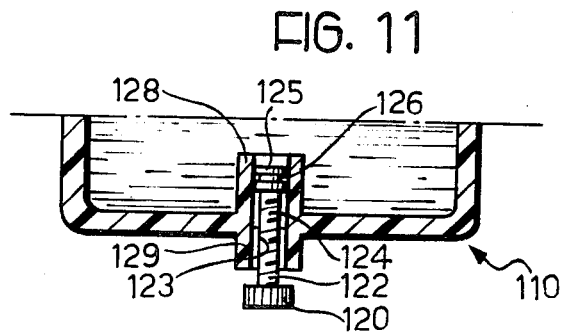

DEPTH GAUGES

BACKGROUND OF THE INVENTION

The invention relates to depth gauges for skin divers or frogmen, or those engaged in underwater sports or other activities.

Prior art pressure sensitive instruments in the field to which the present invention relates include devices having a manometer unit provided with a dial on which is marked a graduated scale and over which is movable an indicator needle connected to a pressure-sensitive element which causes displacement of the needle along the scale as the pressure acting on it varies, a hermetically closed capsule which houses the manometer unit and which has a transparent wall covering the dial and the needle, at least one flexible wall, and a liquid which completely fills the capsule and surrounds the manometer unit, this liquid serving to transmit to the pressure sensitive element of the manometer unit the ambient pressure outside the capsule through the said flexible wall.

Known depth gauge instruments of the above mentioned type are called oil-filled depth gauges, since the liquid which fills the capsule is usually a mineral oil.

In order to obtain an accurate indication of depth it is desirable that the needle of a depth gauge is exactly on the zero of the scale at sea level or at the surface of the stretch of water in which the user is going to dive. Oil-filled depth gauges of the type described above are generally calibrated, upon manufacture, in such a way that the needle is at zero at sea level in the so-called normal conditions of atmospheric pressure (760 mm Hg) and temperature (20° C.). As will be appreciated, however, these conditions rarely exist in reality so that the depth gauge would not in general be accurately at zero before a dive.

The variation of atmospheric pressure due to meteorological phenomena does not have a very great effect on the position of the needle, but it is not entirely negligible. Variations in atmospheric pressure with altitude, however, do have a significant effect as a result of which a depth gauge calibrated quite correctly for immersion in the sea will give an incorrect reading if used for immersion in a mountain lake.

Variations of pressure with altitude can be compensated for in depth gauges made at an altitude greater than sea level, by calibrating it in such a way that the needle, at the locality where the depth gauge is made, indicates a value slightly less than zero so that at sea level the reading is at zero in the socalled normal conditions of temperature and pressure. Again, however, the zero setting is entirely accurate only at the one altitude for which it is designed.

More importantly, variations in temperature have a very significant influence on the reading of an oil-filled depth gauge because the oil or other liquid contained in the capsule expands or contracts with changes in temperature causing variations in the volume of the liquid which represent quite significant pressure variations. Thus at temperatures greater or less than the normal envisaged, the needle of the instrument indicates a value respectively greater or less than zero. Moreover, it is not possible to calibrate an oil-filled depth gauge before each dive because the needle and the manometer unit are inaccessible, being sealed in the capsule.

OBJECT OF THE INVENTION

The object of the present invention is to provide a depth gauge of the oil-filled type which can be calibrated before each immersion by setting the needle to zero at the temperature and pressure conditions existing at the time.

SUMMARY OF THE INVENTION

According to the present invention, there is provided a depth gauge of the type including: a manometer unit having a dial with a graduated scale, an indicator needle movable over said scale of said dial, and a pressure-sensitive mechanism connected to said needle and operating upon changes in the pressure to which it is sensitive to cause displacement of said needle along said scale, a hermetically sealed capsule in which said manometer unit is enclosed, said capsule having: a transparent wall covering said dial and said needle and, at least one flexible wall, and a liquid which completely fills said capsule and surrounds said unit, said liquid transmitting, in use of said instrument the ambient pressure outside said capsule to said pressure-sensitive element of said manometer unit through said at least one flexible wall of said capsule, and calibration means operable, from outside said capsule, to vary the pressure of said liquid contained in said capsule with respect to the ambient pressure obtaining outside said capsule.

Preferebaly, said calibration means has an active surface thereof in contact with said liquid contained in said capsule, said active surface being displaceable in a first direction with respect to said capsule whereby to increase the pressure of said liquid in said capsule, and in a second direction with respect to said capsule whereby to reduce the pressure of said liquid in said capsule.

With such a device the user of the depth gauge can, by operating the calibration means, set the needle of the depth gauge accurately to zero before each dive, thereby obtaining a more precise indication of the depth of the dive, whatever the atmospheric conditions of temperature and pressure obtaining at the surface of the stretch of water in which the dive is being made.

Other features and advantages of the invention will become apparent from a study of the following detailed description in which reference is made to the accompanying drawings, and which is provided purely by way of non-limitative example.

BRIEF DESCRIPTION OF THE DRAWINGS

FIG. 1 is a perspective view of a depth gauge formed as a first embodiment of the invention;

FIG. 2 is an exploded perspective view of the embodiment of FIG. 1;

FIG. 3 is a diametral section taken on the plane indicated by the line III—III of FIG. 1;

FIG. 4 is a fragmentary section taken on the line IV—IV of FIG. 3;

FIGS. 8 and 9 are diametral sections similar to those of FIGS. 3 and 7, illustrating two further embodiments of the invention;

FIG. 10 is a perspective view of a depth gauge formed as another embodiment of the invention; and FIG. 11 is a section taken on the plane indicated by the line XI—XI of FIG. 10.

DESCRIPTION OF THE PREFERRED EMBODIMENTS

Figure 5:
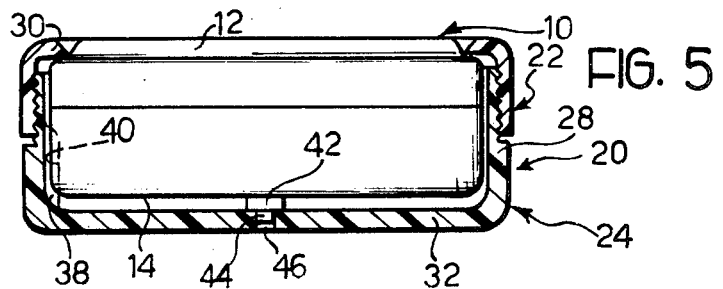
FIG. 5 is a sectional view similar to FIG. 3, of a second embodiment of the invention.

Referring first to the embodiment illustrated in FIGS. 1 to 3, there is shown a depth gauge of a size suitable for wearing on the wrist, having a hermetically sealed capsule 10. The capsule 10 is of a known type which comprises a hollow body of plastics material of discoidal form having a circular outline. The capsule 10 has two opposite main walls one of which, indicated 12, is transparent and will be referred to as the front wall, whilst the other, indicated 14 in FIG. 3 will be referred to as the rear wall. Within the capsule 10 is enclosed a manometer unit which includes a circular dial 16 having a graduated scale. The scale indicates the depth of water, for example in meters, and has a zero mark indicated Z.

The transparent wall 12 extends over the dial 16 and an indicator needle 18 which is movable over the graduated scale of the dial 16. Underneath, or behind, the dial 12 is a pressure-sensitive element (not shown) forming part of the manometer unit, and which generally comprises a Bourdon tube. The pressure-sensitive element is connected to the needle 18 by a system of levers (also not shown) and the capsule 10 is completely filled with an uncoloured transparent mineral oil or other liquid which surrounds the manometer unit.

The rear wall 14 of the capsule 10 is resiliently flexible. In other embodiments, of course, both the front wall 12 and the rear wall 14 may be resiliently flexible. In this way variations in the ambient pressure outside the capsule 10 are transmitted to the liquid contained therein and, via this liquid, to the Bourdon tube or other pressure-sensitive element which causes the needle 18 to move over the graduated scale on the dial 16.

The capsule 10 is enclosed in a casing, generally indicated 20, also of discoidal form, and comprising a main casing shell 24 in the form of a bowl having an outer threaded portion 28 onto which is screwed a correspondingly threaded part 26 of a casing part 22 in the form of a ring having a radially inwardly projecting flange 30 which constitutes a ledge or shoulder against which engages the screen 12 whereby to effect retention of the capsule 10.

The main casing shell 24 has a bottom wall 32 which faces the flexible rear wall 14 of the capsule 10. The bottom wall 32 has a central raised boss 34 against which the rear wall 14 of the capsule engages. Upon manufacture of the depth gauge, the capsule 10 is filled with oil or other liquid through a closable hole (not shown), the flexible rear wall 14 of the capsule 10 (and also the front wall 12 if this is flexible) is in a relaxed state, i.e. it is not elastically deformed. Before closing the above mentioned filling hole, to hermetically seal the capsule 10, a light compressive force is exerted on the capsule by pressing, for example manually, the two opposite main walls 12 and 14 sufficiently to cause a small quantity of liquid to flow out from the capsule through the filling hole. Whilst the capsule is thus compressed the filling hole is sealed so that, upon release of the compressive force, the oil within the interior of the capsule is at a pressure slightly below atmospheric pressure due to the fact that the wall 14 (and possibly also the wall 12) tends to return to the rest condition because of its elasticity.

The precise compressive force applied to the capsule 10 is such that upon release, the pressure within the capsule causes the needle 18 to be positioned down beyond the zero of the scale by a distance slightly greater than that corresponding to the greatest negative pressure it is envisaged that it will be necessary to compensate for in the most adverse conditions of atmospheric pressure and temperature.

If before use of the depth gauge, the needle 18 is in a position lower than the zero of the scale, as indicated 18a in FIG. 1, it is only necessary for a user to screw the ring 22 down with respect to the main casing shell 24, as indicated by the arrow A in FIG. 1, with the result that the raised boss 34, by pressing on the flexible rear wall 14, of the capsule 10 causes an increase of pressure within the interior of the capsule 10 the front face of which is engaged by the radially inwardly directed flange 30. In this way, it is possible to displace the needle to the position corresponding exactly to the graduation Z at the zero position of the scale.

If, on the other hand, before use of the depth gauge the needle is in a position greater than zero, such as that indicated 18b in FIG. 1, it is only necessary to unscrew the ring 22 in the direction of the arrow B of FIG. 1 with respect to the casing shell 24, in order to relieve the pressure in the capsule 10 displacing the needle to the zero position Z of the scale.

One problem that can arise with this embodiment is that, given the circular outline of the capsule 10 and the fact that it is mounted in a circular casing 20, it is to be expected that the capsule 10 will rotate with respect to the casing 20 upon adjustment of the instrument to zero. This is particularly disadvantageous in a wrist instrument such as that illustrated in FIG. 1, in which the casing shell 24 is secured to the wrist of the diver by means of a strap connected to the casing shell 24 by two handles 36 since it is desirable that the dial 16 should retain the same orientation with respect to the eye of the user, which it would not do if the capsule 10 is allowed to turn with respect to the casing 20.

In order to prevent the above mentioned rotation of the capsule 10 there are provided engagement means (FIGS. 2, 3 and 4) which consist of an axially extending rib 38 on the inside of the peripheral wall of the casing shell 24 and a corresponding axially extending groove 40 on the periphery of the capsule 10. Obviously, the positions of the groove and rib could be reversed. At the time when the capsule 10 is fitted into the casing 20 formed by the casing shell 24 and the ring 22, the rib 38 is engaged in the groove 40.

In the embodiment described in relation to FIGS. 1 and 4 there is also the possibility of faulty alignment between the periphery of the transparent face 12 and the radially inwardly directed flange 30 of the ring 22, so that the capsule is out of square with the casing. This shows itself as an oscillation of the capsule 10 when the ring 22 is screwed or unscrewed with respect to the casing shell 24. The embodiment illustrated in FIG. 5 is designed to overcome this. In FIG. 5 the parts of the device corresponding to those illustrated in FIGS. 1 to 4 have been indicated with the same reference numerals and will not be described again in detail. Instead of the boss 34 on the rigid bottom wall 32 of the casing shell 24, there is provided a boss 42 on the resiliently flexible rear wall 14 of the capsule 10. This boss 42 has a central pin 44 projecting out away from the capsule 10, and the bottom wall 32 of the casing shell 24 has a central hole 46 into which the pin 44 fits with precision for the purpose of ensuring accurately square positioning of the capsule 10 as it is fitted between the casing shell 24 and the ring 22 of the casing 20.

Figure 6:
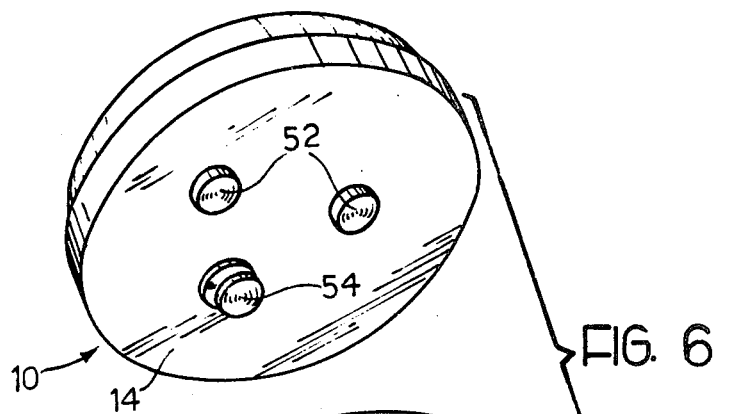
FIG. 6 is an exploded perspective view of a capsule and part of a casing intended to house it, formed as a further embodiment of the invention.
Figure 7:
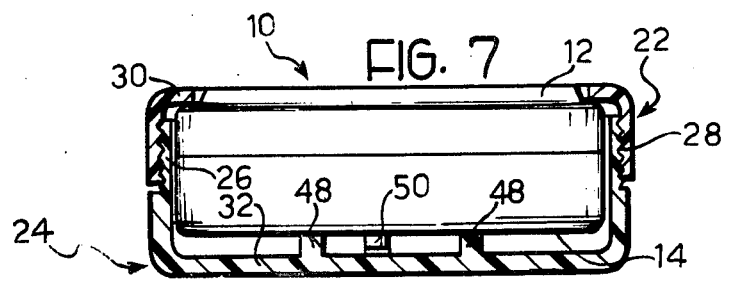
FIG. 7 is a diametral section, similar to that of FIG. 3, but illustrating the embodiment of FIG. 6 and taken on the plane indicated by the line VII—VII of FIG. 6.

In the embodiment of FIGS. 6 and 7, component parts corresponding to those of the preceding Figures have again been indicated with the same reference numerals; the bottom wall 32 of the casing shell 24 has a central raised portion, this time in the form of an annular ridge 48, formed integrally with the bottom wall 32 in which are formed three radial slots 50 separating the annular ridge 48 into three arcuate segments. The flexible rear wall 14 of the capsule 10 has, in positions corresponding to the three slots 50, a set of three bosses intended to engage in the slots 50. Two of these bosses, indicated 52, are formed by moulding the plastics material of the rear wall 14, whilst the third boss, indicated 54, is constituted by the closure plug of the filling hole for the capsule 10. The engagement of the bosses 52, 54 in the slots 50 prevents rotation of the capsule 10 with respect to the casing 20 and, moreover, the larger surface contact area offered by the annular rib 50 assists in accurate positioning of the capsule 10 in the casing 20.

In FIG. 8 is illustrated a further embodiment in which the capsule 10 is identical to that of the preceding Figures, but in which the casing, indicated 80, although having a configuration similar to that above, is formed by a casing shell 84 and closure ring 82 snap engaged together, for example by means of a groove or dovetail coupling indicated 86. In this embodiment, the resiliently flexible rear wall 14 of the capsule 10 is engaged, or engageable, by the rounded end of a pressure screw 88 having a slot 94, which is screwed into a central threaded hole 90 in the bottom wall 92 of the casing shell 84. Adjustment of the depth gauge of FIG. 8 is obtainable by turning the screw 88 from outside the casing, in one sense or the other, by means of a screwdriver, a knife blade, a coin or the like, inserted into the slot 94 of the screw.

In the embodiment of FIG. 8 the same disadvantage as that of FIG. 3, that is movement of the capsule 10 within the casing can occur. This disadvantage can be avoided, as illustrated in FIG. 9, by providing a raised portion in the form of a boss 96 integral with the resiliently flexible wall 14 of the capsule 10 having a projecting pin 98 similar to the embodiment of FIG. 5. Upon assembly, the pin 98 is engaged with precision into a central axial hole 100 of a pressure screw 102, lodged in a threaded hole 103 in the rear wall 92 of the casing shell 84. The screw 102 is equivalent to the screw 90, but is of tubular form and provided, on the face thereof outwardly of the casing 80, with a ring of holes 104 engageable by means of a suitable tool.

In FIGS. 10 and 11 is illustrated another embodiment of portable depth gauge which has no separate casing but includes only a capsule, generally indicated 110, which can be formed entirely of plastics material, with at least one transparent face 112 serving as the covering screen for a dial 114 having an associated needle 116. The capsule 110 is provided, as is shown, with a pair of handles 118 for the attachment of a wrist strap. As can be seen in the drawings, the capsule 10 has a generally rectangular form and on one of its side walls 119 is provided with a knurled knob 120. This latter is rigidly connected to a threaded shaft 122, engaged in a threaded axial hole 123 of a bush 124 fixed into a boss 129 projecting from the wall 119.

The shaft 122 in its turn is rigidly connected to a piston 125 provided with a sealing washer 126 which seals the piston 125 in a cylinder 128 constituted by an inwardly projecting tubular element extending inwardly from the side wall 119 of the capsule 110 and coaxially aligned with the hollow boss 129 housing the bush 124. In this embodiment adjustments to the pressure of the oil or other liquid within the capsule 110 in order to set the needle 116 to zero if it is below zero, is obtainable by turning the knob 120 by hand in a clockwise sense as indicated by the arrow A of FIG. 10, whilst resetting the needle 116 to zero from above the zero position is achieved by turning the knob 120 in the opposite sense as indicated by the arrow B.

Naturally, the invention is not limited to the embodiments which have been described and illustrated, and comprehends any sort of depth gauge having calibration means associated with the pressure sensitive element and operable externally to adjust the zero reading of the instrument. In depth gauges of the oil-filled type as described above this can conveniently be achieved by operating in some way to vary the pressure of the liquid contained in the capsule with respect to the pressure obtaining outside the capsule. In particular, the invention comprehends those embodiments in which the calibration means includes a surface, such as the inner face of the flexible wall 14 of the capsule 10 or the inner face of the piston 125, situated in contact with the liquid contained in the capsule and displaceable towards the interior of the capsule itself to increase the pressure of the liquid and in the opposite sense to reduce the pressure of the liquid.

What is claimed is:

1. A depth gauge of the type including:
   a manometer unit having a dial with a graduated scale,
   an indicator needle movable over said scale of said dial,
   a pressure-sensitive mechanism connected to said needle and operating upon changes in the pressure to which it is sensitive to cause displacement of said needle along said scale,
   a hermetically sealed capsule in which said manometer unit is enclosed, said capsule having:
   a transparent wall covering said dial and said needle,
   at least one flexible wall, and
   a liquid which completely fills said capsule and surrounds said unit, said liquid transmitting, in use of said instrument, the ambient pressure outside said capsule to said pressure-sensitive element of said manometer unit through said at least one flexible wall of said capsule, and
   a casing which embraces said capsule, said casing having:
   screw threaded adjuster means which are adapted to come into abutment with said at least one resiliently flexible wall of said capsule, said adjuster means being operable from outside of said casing, and
   shoulder means to restrain movement of said capsule away from said adjuster means, said adjuster means being operable, when screwed in one direction or the other, to cause flexure of said at least one resiliently flexible wall of said capsule to vary the pressure of said liquid contained in said capsule with respect to the ambient pressure, whereby to set said needle to zero on said scale.

2. A depth gauge as in claim 1, wherein said capsule is sealed with said resiliently flexible wall in an inwardly flexed condition whereby to maintain the liquid within said capsule at a pressure lower than the ambient pressure outside said capsule when said screw threaded adjuster means are backed off from abutment with said resiliently flexible wall.

3. A depth gauge as in claim 1 or claim 2, wherein said capsule has a discoidal form with two opposite main walls, one of which is transparent and extends over said dial and the other of which is said resiliently flexible wall, said capsule being enclosed in a casing of discoidal form comprising:
   a casing shell part having a bottom wall and an upstanding peripheral wall, and
   an annular part threadedly engaged on the peripheral wall of said casing shell part,
   a radially inwardly projecting lip of said annular part serving as an abutment for engaging the periphery of said transparent main wall of said capsule, one of said bottom wall of said casing shell part and means carried thereby engaging said resiliently flexible wall of said capsule whereby screwing of said annular part of said casing with respect to said casing shell part thereof causes flexure of said flexible wall of said capsule whereby to adjust the pressure of said liquid in said capsule.

4. A depth gauge as in claim 3, wherein said capsule has a circular plan form and the interior of said casing has a corresponding circular form, said capsule and casing shell part each having cooperating means for preventing relative rotation.

5. A depth gauge as in claim 4, wherein said cooperating means comprise a projection on one of said casing shell part and said capsule, said projection extending radially with respect to said circular plan form of the part on which it is formed, and a groove of corresponding form on the other of said capsule and said casing shell part, said projection being engaged in said groove upon assembly of said instrument.

6. A depth gauge as in any of claims 3, wherein one of said bottom wall of said casing shell part and said resiliently flexible wall of said capsule has a raised part projecting towards the other in a central region thereof.

7. A depth gauge as in claim 6, wherein said central raised part is a boss on said resiliently flexible wall of said capsule, said boss having a central pin projecting towards said bottom wall of said casing shell part, said casing shell part having means defining a central hole coaxially aligned with said central pin and into which said central pin is engaged.

8. A depth gauge as in claim 6, wherein said raised part is an annular ridge.

9. A depth gauge as in claim 8, wherein said annular ridge has at least one radial slot therein, the wall facing said annular ridge being provided with a boss engageable in said slot whereby to prevent relative rotation of said capsule and said casing shell.

10. A depth gauge as in claim 1, wherein said screw thread adjuster means is a tubular screw having an axial hole extending therethrough,
   a central pin of said resiliently flexible wall engaging in said hole of said tubular screw.

* * * * *